FULLER & SEVERANCE.
Lamp-Wick Tube.

No. 84,542.

Patented Dec. 1, 1868.

Witnesses.
Wm. A. Morgan
G. C. Cotton

Inventors.
F. H. Fuller
O. S. Severance
Per Munn & Co
Attorneys

United States Patent Office.

FRANK H. FULLER AND OREN S. SEVERANCE, OF SOUTH BOSTON, MASSACHUSETTS.

Letters Patent No. 84,542, dated December 1, 1868.

IMPROVEMENT IN LAMP-WICK TUBES.

The Schedule referred to in these Letters Patent and making part of the same.

*To all whom it may concern:*

Be it known that we, FRANK H. FULLER and OREN S. SEVERANCE, of South Boston, in the county of Suffolk, and State of Massachusetts, have invented a new and useful Improvement in Lamp-Wick Tubes; and we do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
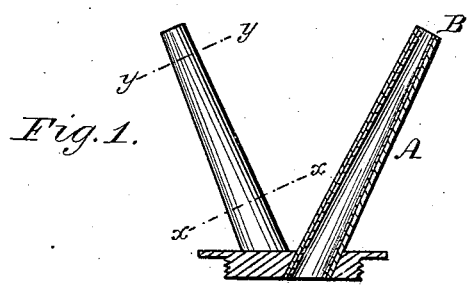
Figure 1 represents a lamp-top provided with one tube in elevation, and one in section.
Figure 2:
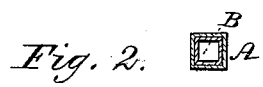
Figure 2 represents a cross-section on the line $x\ x$.
Figure 3:
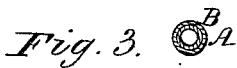
Figure 3 represents a cross-section on the line $y\ y$.

The nature of this invention relates to improvements in lamp-wick tubes, the object of which is to purify the oil, and prevent explosions.

It consists in a wick-tube, provided with isinglass lining, by the action of which on the oil, it is anticipated very much improved results will be obtained, as will be more fully described on reference to the accompanying drawings, wherein—

A represents a wick-tube, designed for a round wick, made of brass or any other suitable metal, and preferably of square form at the lower end, gradually merging into circular form at the top.

B represents a lining of isinglass, which, being a non-conductor of heat, prevents, in a great measure, the generation of gas within the lamp, whereby explosions are much less liable to occur.

The oil, being maintained in a cooler condition, burns with a purer flame, and is less liable to smoke.

Having thus described our invention,

We claim as new, and desire to secure by Letters Patent—

The combination, with a lamp-wick tube, of isinglass lining, substantially as and for the purpose described.

FRANK H. FULLER.
OREN S. SEVERANCE.

Witnesses:
C. P. ROCKWOOD,
ISAAC T. CAMPBELL.